Figures 1, 2:
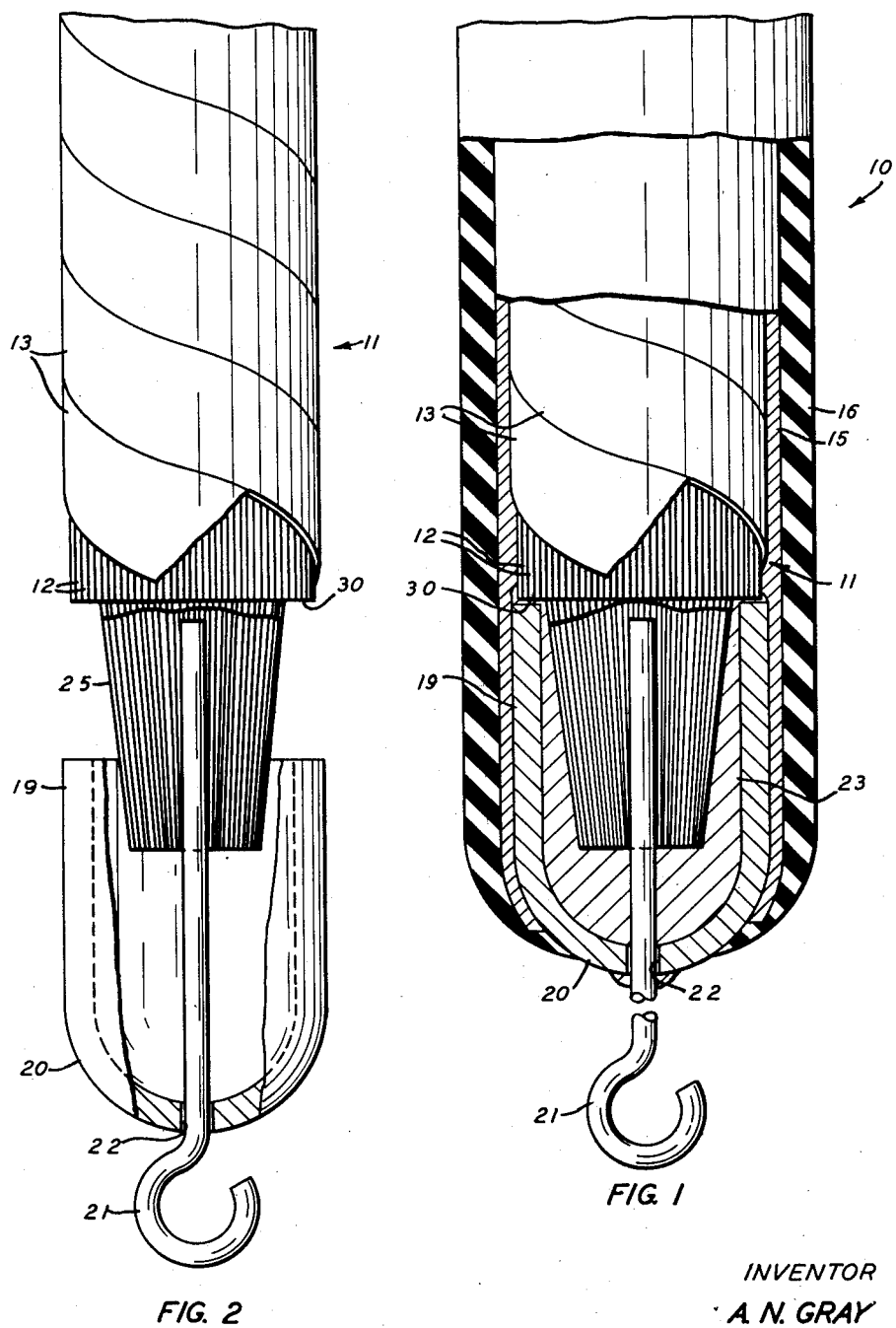

March 3, 1953    A. N. GRAY    2,629,921
METHOD OF SHEATHING CABLE CORES
Filed Feb. 4, 1950

INVENTOR
A. N. GRAY
BY [signature]
ATTORNEY

Patented Mar. 3, 1953

2,629,921

UNITED STATES PATENT OFFICE 2,629,921

METHOD OF SHEATHING CABLE CORES

Alvin N. Gray, Edgewood, Md., assignor to Western Electric Company, Incorporated, New York, N. Y., a corporation of New York Application February 4, 1950, Serial No. 142,514

1 Claim. (Cl. 29—148)

This invention relates to methods of sheathing cable cores, and more particularly to methods of sheathing cable cores so that they may be advanced through vulcanizing apparatus.

In the manufacture of certain types of lead sheathed, multi-conductor cables, such as those used in the communications field, it sometimes is desirable to apply a protective covering of vulcanized rubber or rubber-like compound around the lead sheath. Usually the covering is applied around a lead sheath by an extruding apparatus, and is vulcanized thereafter by advancing the covered cable through an elongated vulcanizing tube containing high pressure, high temperature steam. Since the cable core must be kept in a dry condition to maintain the insulation of the individual conductors effective, it is necessary to seal the ends of the cable before it passes through the vulcanizing tube to prevent the steam from entering and damaging the insulation of the conductors.

An object of the invention is to provide new and improved methods of sheathing cable cores.

Another object of the invention is to provide new and improved methods of sheathing cable cores so that they may be advanced through vulcanizing apparatus.

A method of sheathing multi-conductor cable cores embodying certain features of the invention comprises securing a cap to one end of the cable core, and extruding a lead sheath over the cable core so that the sheath adheres to the cap to form a tight seal therewith.

A complete understanding of the invention may be had from the following detailed description of specific embodiments thereof, when read in conjunction with the appended drawing, in which:

Fig. 1 is a fragmentary, partially sectional view of a multi-conductor cable which may be manufactured by methods embodying certain features of the invention, and Fig. 2 is a fragmentary view of the cable shown in Fig. 1 during one stage of its fabrication.

Referring now to Fig. 1, there is shown an end portion of a completed cable 10 of a type generally used in the communications field for transmitting telephone messages over long distances. The cable 10 includes a composite core 11, which includes a plurality of individually insulated conductors 12—12 twisted together in a predetermined group and having several layers of paper tape 13—13 served spirally around the group of conductors. The core 11 is enclosed in a thin lead sheath 15, which in turn, is covered by a heavy jacket 16 of a suitable vulcanizable compound, such as rubber, or synthetic rubber-like compounds.

A cup shaped cap 20 preferably composed of lead or a lead alloy is secured to the end of the cable core 11, and the lead sheath 15 applied over the core 11 encloses a sleeve portion 19 of the cap and is fused thereto. The cap seals the end of the cable to prevent entrance of high pressure, high temperature steam used to vulcanize the jacket 16 into the cable core. An eyebolt 21 secured to the end of the cable core 11 may be attached to a chain, a cable or other pulling instrumentality to pull the cable whenever necessary in forming the sheath 15 and the jacket 16 and in installing the cable in a conduit or a trough.

In applying and sheathing the core 11, the core usually is coiled on a suitable reel and placed in a conventional drying oven for a given period of time in order to remove excess moisture from the insulation surrounding the individual conductors of the cable core. When the cable core 11 is dry, the paper tape 13 is stripped from one end of the cable core 11 for a predetermined distance sufficient to permit the end of the core to be prepared to fit into the cap 20. The end portions of some of the conductors 12—12 at the end of the cable are cut away to form a reduced end portion 25 of the core which fits into the cap 20 with a predetermined clearance between the core and the cap. The insulation surrounding the individual conductors of the reduced portion 25 of the core 11 is removed along the reduced portion 25, and the shank of the eyebolt 21 is passed through a bore 22 provided in the end of the cap 20, and is inserted into the center of the core to the position thereof shown in Fig. 2. The bare conductors 12—12 near the center of the core are first soldered to the eyebolt 21, and the bared end portions of the remaining conductors are soldered together layer by layer until all the conductors are soldered together.

After the eyebolt is soldered to the end of the core 11, in this manner, the lead cap 20 is filled partially with a molten lead, or a suitable lead alloy, and is positioned over the end of the cable core 11 to a position in which the end of the cap abuts a shoulder 30 of the cable core. The cap carries molten metal 23 around the reduced portion of the core 11 so that this end of the core is completely surrounded by the molten metal. When the molten metal 23 solidifies, the cap 20 is welded securely to the end of the cable core and the bore 22 is sealed hermetically against entrance of high pressure fluids by the metal 23 which has flowed into the bore 22 as the cap is moved into the position shown in Fig. 1.

After the cap 20 has been secured to the end of the cable core 11 in this manner, the other end of the cable core is capped identically with the capping described hereinabove, and the end of the cable is withdrawn from the reel positioned in the oven and advanced through a continuous lead extruding apparatus of a well known type which form the thin lead sheath 15 around the core 11 and the sleeve portions of the caps. The outside diameter of the sleeve portion 19 of the cap is substantially the same as that of the core 11 so that the cap may be advanced through the lead extruding apparatus. The lead sheath is formed of hot lead in a plastic condition, and welds itself to the sleeve portion of the lead caps on the ends of the core to form pressure-tight seals on the ends of the cable core 11.

One type of an apparatus which may be used for extruding the lead sheath 15 around the core 11 is known as a "Pirelli" lead press which is described fully on pages 319 to 324, inclusive, of the issue of the British publication "Engineering," published April 8, 1949.

The cable core having the sheath 15 thereon is passed through a suitable apparatus designed to apply a rubber and lead adherent compound on the sheath 15. One type of rubber adherent compound, which may be used for purposes of this invention, is described in T. K. Cox et al. Patent 2,393,024, issued January 15, 1946. Apparatus similar to that shown in Patent 2,393,024 may be used to apply the rubber adherent compound on the lead sheath of the cable 10.

Immediately after the application of the rubber adherent compound, the capped and sheathed cable core is advanced directly through an extruding apparatus of a well known type, which extrudes the heavy jacket 16 of the vulcanizable compound, such as a rubber compound, or a synthetic rubber-like compound, over the lead sheath 15. The jacketed core is advanced continuously and directly from the extruding apparatus into and through an elongated vulcanizing tube filled with a high temperature, high pressure vulcanizing fluid, such as high pressure, high temperature steam. The vulcanizing fluid heats the jacket under sufficient pressure to vulcanize the jacket. The rubber and lead adherent compound applied on the sheath, reacts with the vulcanizable compound during the vulcanization process so as to bind the vulcanized jacket 16 securely to the lead sheath. As the cable 10 leaves the tube containing the vulcanizing fluid, it passes directly through a low temperature fluid, such as low temperature water, to cool the vulcanized jacket 16, and thereafter the completed cable 10 is coiled up on a takeup reel. The caps 20—20 hermetically sealed to the lead sheath, prevent the fluid used in the vulcanizing tube and the cooling fluid from entering and damaging the insulation of the individual conductors of the core 11.

One type of apparatus that may be used to extrude the vulcanizable compound cover around the lead sheath of the cable 10 and to vulcanize the jacket 16 is described in G. L. Cherry Patent 1,770,969 issued July 22, 1930.

The above-described steps in the manufacture of the cable 10 also may be carried out with interruptions between the several steps as well as continuously. For example, a given length of the core 11, having a cap 20 secured on each end thereof, may be withdrawn from its storage reel and advanced through the lead extruding apparatus, and thereafter coiled up on another cable reel. The sheathed cable core may be stored for an indefinite time without acquiring moisture, or it may be transported in reeled condition directly from the lead extruding apparatus to the apparatus designed to apply the rubber adherent compound to the lead sheath. The adhesive compound applying apparatus, the extruding apparatus, the vulcanizing tube and the cooling apparatus may be positioned in tandem, since it is desirable to extrude the vulcanizing compound over the lead sheath immediately after the rubber adherent compound is applied. This procedure is well suited to factory conditions which prevent the manufacture of such cables by a continuous process due to the floor space required to carry out such a process.

To manufacture such cables by a substantially continuous process, the lead extruding apparatus, the apparatus for applying the rubber and lead adherent compound, the compound extruding apparatus, the vulcanizing tube, the cooling apparatus and the takeup apparatus are positioned in tandem in the order named. One or more capstans usually are positioned at suitable points in the tandem arrangement to advance the cable core and the finished cable through the apparatus. In this arrangement, at the start, the cable core is pulled through the apparatus by a suitable chain or rope attached to the eyebolt 21 secured to the forward end of the cable core until it is engaged by the capstans provided for advancing the cable through the apparatus. When the trailing end of the first length of a cable core, like the core 11, leaves its supply reel, it is connected to the leading end of another length of the same type of cable core by a short length of chain or wire rope so that the cable core being advanced through the lead press, the apparatus for applying the rubber adherent compound and the compound extruding apparatus will pull the next length of cable through the apparatus. This arrangement of the eyebolts secured to the ends of the cable cores facilitates using a substantially continuous process of manufacturing the cable 10.

The cap 20 secured on the end of the cable and covered by the lead sheath 15 produces a pressure tight seal on the end of the cable impervious to air and moisture, thereby preventing infiltration of air and moisture into the cable while the cable is stored. The eyebolt 21 is soldered to the core 11 in the manner described so that when the eyebolt is used to pull the cable or core all of the pull is transmitted to the core and not to the cap on the lead sheath.

The cap 20 is described as being made principally of lead because the hot plastic lead of the sheath 15 will adhere readily to lead. It is to be understood, however, that the cap 20 may be made of steel or iron and lead plated so that the lead sheath 15 will adhere to the cap, or it may be made of brass, copper or other metals to which molten lead will adhere readily.

While the above-described method of sealing the ends of a cable core so that it may be advanced through conventional vulcanizing apparatus is particularly suitable for manufacturing multi-conductor telephone cables, it may be readily adapted to seal the ends of other types of cable cores without departing from the spirit and scope of the invention.

What is claimed is:

The method of sheathing insulated cable cores, which comprises the steps of cutting both ends of a cable core to form portions of reduced size, soldering to each end of the cable core a shank of an eyebolt which extends through a bore in a cap, pouring molten lead into each cap until it is partially full, positioning the caps abutting the ends of the cable core so that the molten lead will secure the caps to the reduced ends of the cable core, linking a series of such capped cable cores together end to end by means of their eyebolts, and continuously advancing the series of cable cores through a lead press, a rubber extruder, and a tube containing a vulcanizing fluid under high temperature and high pressure all arranged in tandem to apply sequentially a continuous lead sheath over the cable core and a continuous, vulcanized rubber covering over the lead sheath.

ALVIN N. GRAY.

REFERENCES CITED

The following references are of record in the file of this patent:

UNITED STATES PATENTS

| Number | Name | Date |
| --- | --- | --- |
| 782,367 | Sturdevant | Feb. 14, 1905 |
| 867,659 | Hoopes et al. | Oct. 8, 1907 |
| 1,484,202 | Baker | Feb. 19, 1924 |
| 1,509,102 | Dana | Sept. 23, 1924 |
| 1,702,332 | Apt | Feb. 19, 1929 |
| 1,892,551 | Hayman | Dec. 27, 1932 |
| 2,309,439 | Burgett | Jan. 26, 1943 |